J. H. FORD.
ATTACHMENT FOR CULTIVATORS.
APPLICATION FILED MAR. 16, 1916.
1,271,882.
Patented July 9, 1918.
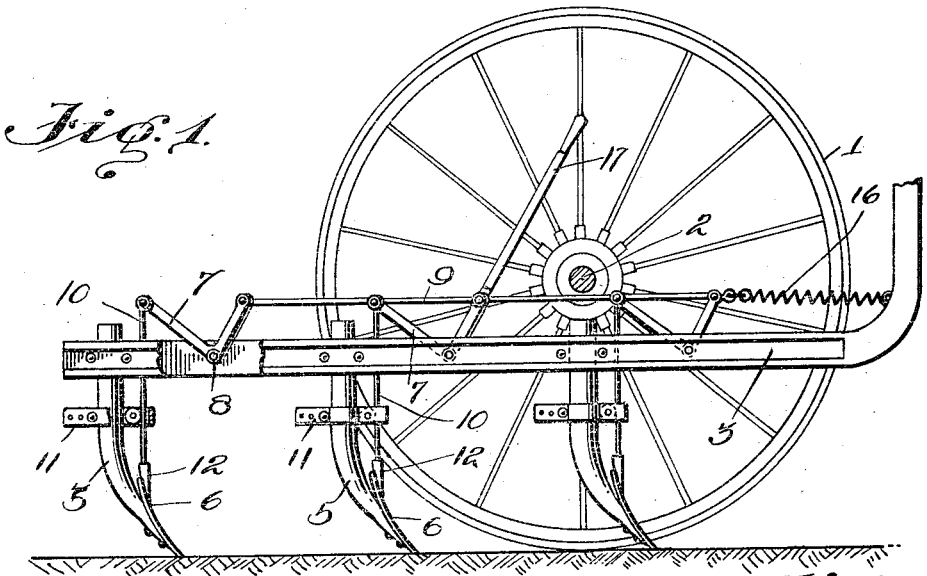
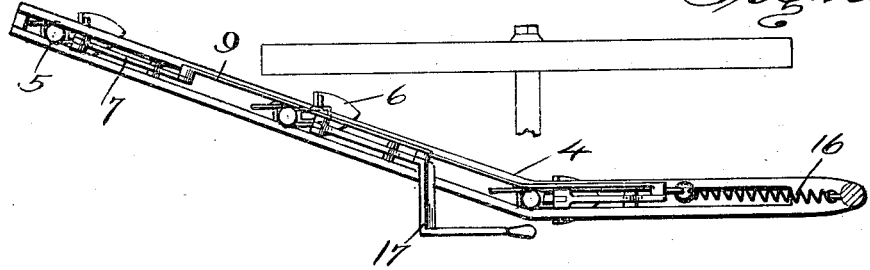
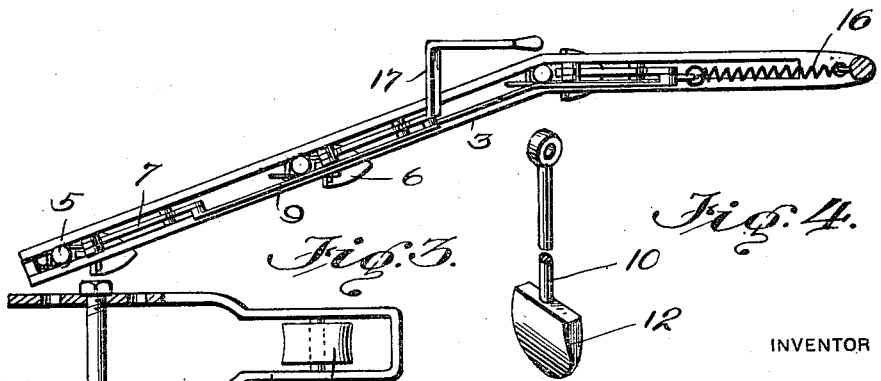
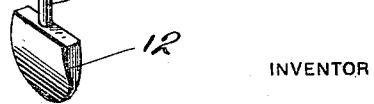
INVENTOR
John H. Ford
WITNESSES
ATTORNEY

UNITED STATES PATENT OFFICE.

JOHN H. FORD, OF WEBSTER CITY, IOWA.

ATTACHMENT FOR CULTIVATORS.

1,271,882.                    Specification of Letters Patent.    Patented July 9, 1918.

Application filed March 16, 1916. Serial No. 84,679.

*To all whom it may concern:*

Be it known that I, JOHN H. FORD, a citizen of the United States, residing at Webster City, in the county of Hamilton and State of Iowa, have invented certain new and useful Improvements in Attachments for Cultivators, of which the following is a specification.

An object of my invention is to provide an attachment which may be fitted to the standard form of cultivator, and which has scrapers so associated therewith that they rest normally adjacent the shovels of the machine at a sufficient elevation that they do not interfere with the proper working thereof, and upon operation of the parts, these scrapers may be brought to move across the faces of the shovels in a downward scraping path to disengage weeds, stubbles, or any other trash which may have collected on the shovels.

A further object is to so construct the parts that the attachment may be fitted to various types of cultivators, and to provide means by which the scrapers are normally held in the inoperative relation.

With the above and other objects in view, my invention consists in certain novel features of construction and combinations of parts which will be hereinafter set forth in connection with the drawings and then more particularly pointed out in the claims.

In the drawings:—

Figure 1 is a view in side elevation of a portion of a cultivator mechanism with my invention applied thereon.

Fig. 2 is a top plan view of the cultivator structure with parts removed to better illustrate the invention.

Fig. 3 is an enlarged detail view of a portion of the attachment.

Fig. 4 is an enlarged perspective view of one of the scrapers.

As here shown, the invention is applied to a riding or wheeled cultivator, and the wheels 1 which are mounted on the shafts 2 carry the beams 3 and 4 which are preferably arranged in a substantially V-shaped form to be divergent from their forward ends which are slightly separated to permit the cultivator shovels to straddle the rows of growing plants.

The shovel shanks 5 are mounted in the beams 3 and 4 and at their lower ends have the shovels 6 secured. The bell crank shaped scraper supporting levers 7 are pivotally mounted on the beams 3 and 4 adjacent the mounting of the shovel shanks 5, by means of pins or bolts 8. A rod 9 is pivotally connected with one of the arms of each of the bell crank shaped levers 7 so that this rod is arranged to act as a common operating rod for the several levers. Scraper carrying rods 10 are pivotally connected with the free arm of each of the bell crank levers 7, and these rods 10 are extended down through the clamps 11 to have the lower ends adjacent the upper edges of the shovels 6. The scrapers 12, which are shaped to conform substantially to the forward faces of the shovels 6, are secured on the lower ends of rods 10, and the clamps 11 hold and guide these rods in a manner that as the common operating rod 9 is actuated to cause swinging movement of the bell crank shaped levers 7, the scrapers 12 will be moved in contact with and over the forward faces of the cultivator shovels to loosen and dislodge any foreign matter or trash which may have collected thereon, the friction rolls 13 being provided to reduce the frictional force exerted by the movement of these scraper supporting rods 10. The clamps 11 have a plurality of openings 14 formed through the slit ends thereof and a clamp bolt 15 is provided to be fitted through the proper opening to mount the clamp in the desired operative relation to permit mounting of the same on various forms and sizes of shovel shanks.

A coil spring 16 is connected with the common operating rod 9 and with the beam 3, and thus a tension is constantly exerted on the bell crank shaped levers 7 to swing the same in a relation that the supporting rods 10 and the scrapers 12 are maintained in the raised position. An operating lever 17 is independently mounted on the beams of the cultivator, or this operating lever might be formed as a continuation of one of the arms of one of the bell crank shaped levers 7, and in either case this lever 17 is pivotally connected with the common operating rod 9 in such a relation that as the lever 17 is swung to move the operating rod 9 against the drawing tension of the spring 16, the several levers 7 will be moved with the result as hereinbefore set forth. While the above discussion refers perhaps more particularly to the disclosure in Fig. 1, it will be understood that the parts connected with the cultivator beams 4 are identical, and for this reason the same reference characters have been applied.

From the foregoing it will be seen that I have provided an attachment which may be either applied to the cultivators as they are completed in the factory, or which may be sold independently of the particular machine to which it is to be applied, and which may be fitted without the use of special tools, and further, it will be seen that the parts are normally held in such position that they do not interfere with the proper working of the cultivator, but that when the shovels have become clogged through the collection of foreign matter thereon, the operating lever 17 may be swung to bring each of the scrapers in a downward scraping path across the face of the shovel adjacent which it is mounted and thus the shovels will be cleaned and after the handle is released, the parts will then move to the inoperative position, this attachment making it possible to clean the shovels without interference with the proper operation of the machine and without stopping the same.

While I have herein shown and described only one specific form of the device, it will be understood that the operating lever might be constructed and mounted in varied relations to meet the particular requirements in use, and that other parts of the structure and combinations of the same might be resorted to without departing from the spirit and scope of my invention and hence I do not wish to be limited to the exact disclosure but only to such points as may be set forth in the claims.

I claim:

1. A cultivator comprising a frame, a shovel shank supported upon said frame, a shovel blade carried by said shank, a guiding bracket clamped upon said shank and provided with a closed forward end, a roller mounted within the closed forward end of said bracket, a scraper provided with a scraper blade working upon said shovel blade, a rod secured to said scraper blade and bearing upon said roller, said roller constituting a fulcrum for said rod and causing the same to swing and permit said scraper blade to follow the contour of said shovel blade, and a bell crank lever supported upon said frame and engaging said rod for reciprocating said rod.

2. A cultivator of the class described comprising a frame, a shovel carried by said frame, a shovel blade carried by said shank, a guiding bracket carried by said shank, said guiding bracket being placed upon said shank intermediate the ends thereof, a scraper rod extending through said bracket, said bracket constituting a fulcrum for said scraper rod, a bell crank lever supported upon said frame and connected to the upper end of said scraper rod, a scraper blade carried by the lower end of said rod and adapted to work upon the forward face of said shovel blade, and said shovel blade having the forward face thereof formed on the contour of an arc of a circle described by the outer end of said bell crank lever when the same is operated.

In testimony whereof I affix my signature in presence of two witnesses.

JOHN H. FORD.

Witnesses:
I. J. SAYER,
T. A. MYERS.

Copies of this patent may be obtained for five cents each, by addressing the "Commissioner of Patents, Washington, D. C."